Figure 3:
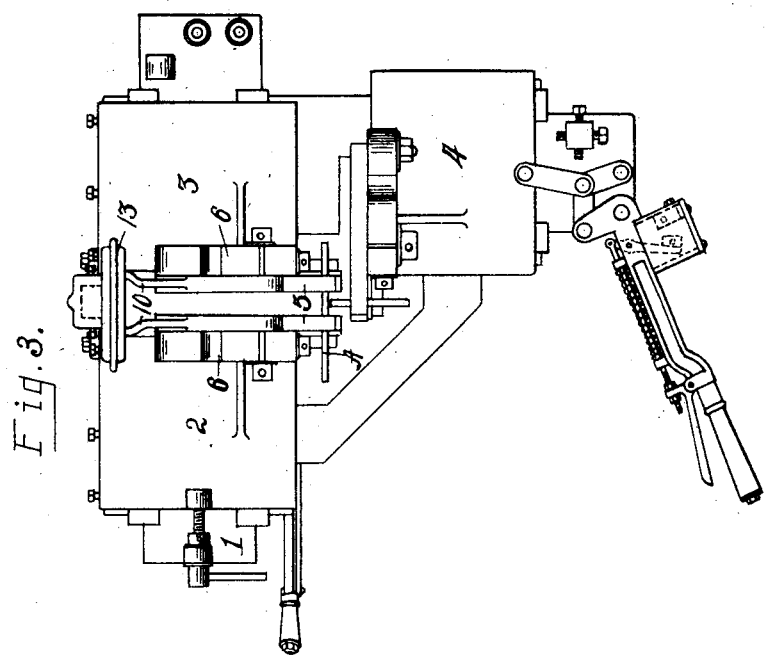

A. E. BUCHENBERG.
ELECTRIC WELDING MACHINE.
APPLICATION FILED MAR. 26, 1909.
943,861.
Patented Dec. 21, 1909.
4 SHEETS—SHEET 1.
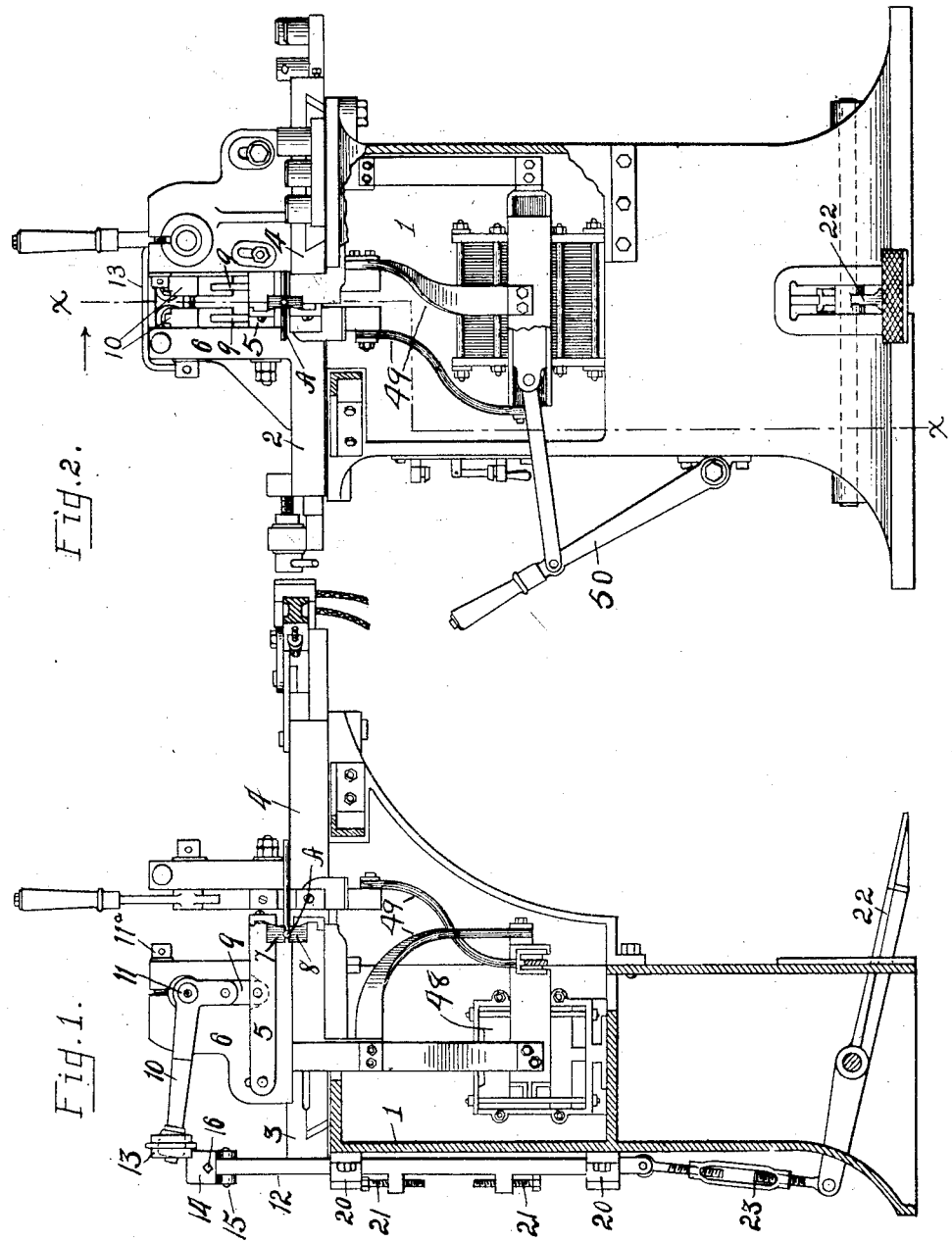
WITNESSES:
D. C. Watter
INVENTOR.
Alvin E. Buchenberg.
By Owen & Owen,
His attys.

A. E. BUCHENBERG.
ELECTRIC WELDING MACHINE.
APPLICATION FILED MAR. 26, 1909.

943,861.

Patented Dec. 21, 1909.
4 SHEETS—SHEET 2.

WITNESSES:
D. C. Walter

INVENTOR.
Alvin E. Buchenberg,
By Owen & Owen,
His attys.

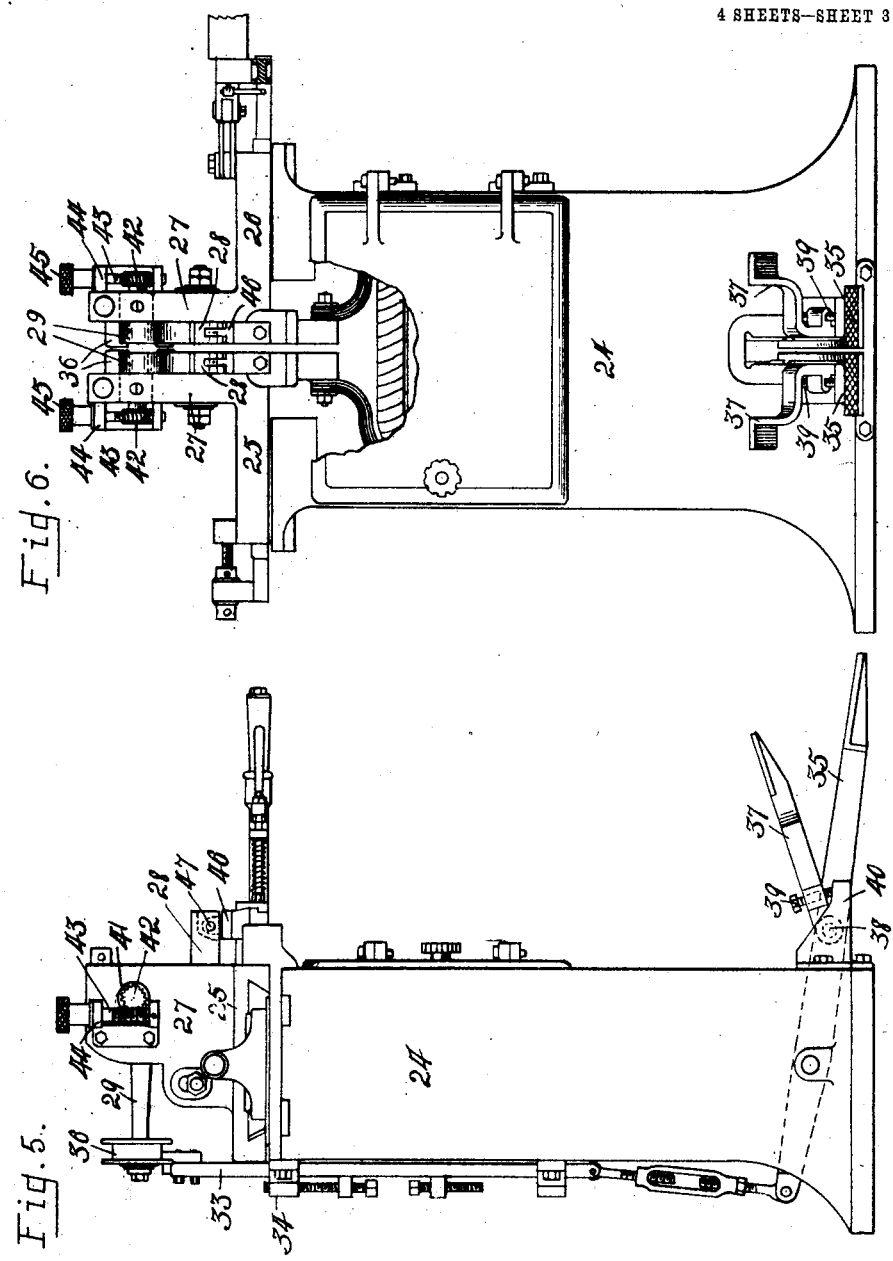

A. E. BUCHENBERG.
ELECTRIC WELDING MACHINE.
APPLICATION FILED MAR. 26, 1909.
943,861.
Patented Dec. 21, 1909.
4 SHEETS—SHEET 4.
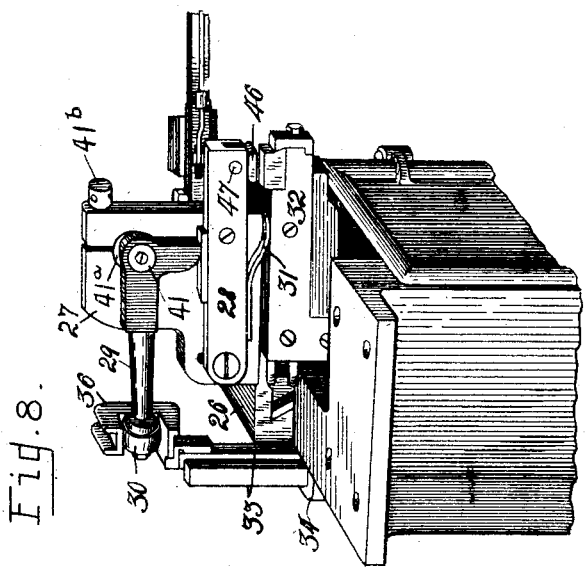
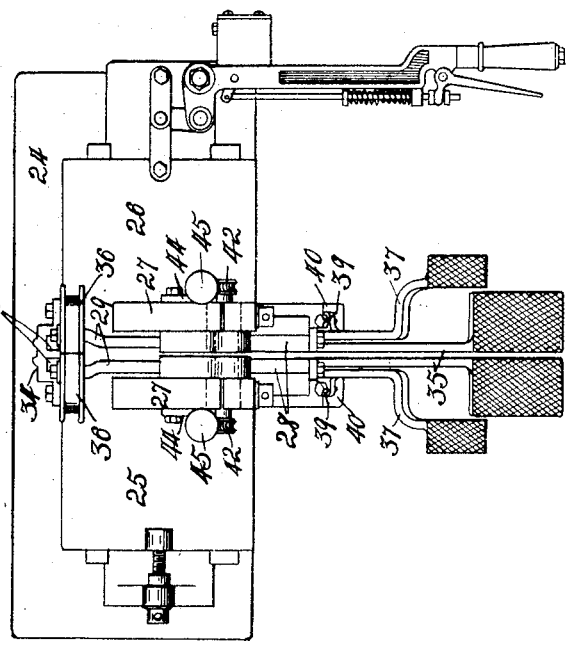
WITNESSES:
D. C. Walter
Cornell Schreiber
INVENTOR.
Alvin E. Buchenberg
By Owen & Owen,
His attys.

UNITED STATES PATENT OFFICE.

ALVIN E. BUCHENBERG, OF TOLEDO, OHIO, ASSIGNOR TO THE TOLEDO ELECTRI WELDING COMPANY, OF TOLEDO, OHIO, A CORPORATION OF OHIO.

ELECTRIC-WELDING MACHINE.

943,861.     Specification of Letters Patent.     Patented Dec. 21, 1909.

Application filed March 26, 1909. Serial No. 485,957.

*To all whom it may concern:*

Be it known that I, ALVIN E. BUCHENBERG, a citizen of the United States, and a resident of Toledo, in the county of Lucas and State of Ohio, have invented a certain new and useful Electric-Welding Machine; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to apparatus for welding or performing similar operations by passing heavy electric currents through the work for the purpose of raising the same to the desired working temperature.

An object of my invention is the provision, in a machine of either the single or double welding type, of simple and efficient means for connecting the operating treadle or treadles to the levers carrying the work-clamping jaws, whereby such levers and treadle or treadles, as the case may be, are permitted to have free relative lateral movements, as the relative to and fro movements of the work-carrying tables may require, without disconnecting the jaw-carrying levers and treadle or treadles or effecting the working thereof at any point within the range of such relative movements, and which means is also adapted to permit the jaw-carrying levers to have relative oscillatory movements whereby as they are moved to effect a gripping of the work they are capable of automatically adjusting themselves as the varying thickness of articles separately clamped thereby may require, as is hereinafter more fully explained.

A further object of my invention is the provision in apparatus of this class of simple and efficient means for effecting an accurate, rapid and easy adjustment of the eccentrics carrying the levers which actuate the clamping movements of the work-gripping levers.

Further objects of my invention, as well as the operation, construction and arrangement of the parts thereof will be apparent by reference to the following specification and to the accompanying drawings, which illustrate different forms of the invention, and in which,—

Figure 4:
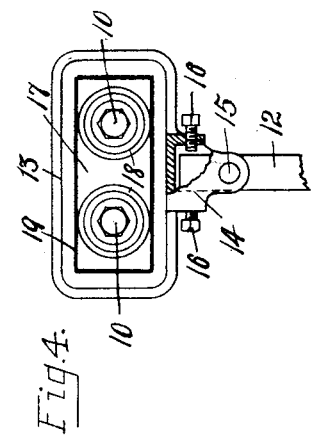

Figure 1 is a vertical section on the line *x x* in Fig. 2 of a double welding type of machine embodying some of the features of my invention. Fig. 2 is a front elevation thereof with portions broken away. Fig. 3 is a plan view of the same. Fig. 4 is an enlarged rear elevation of the upper end of the treadle-rod and its manner of connection with the jaw-carrying levers to adapt them to move laterally relative to such rod and to automatically adjust themselves to grip work of different thicknesses with a portion broken away. Figs. 5, 6 and 7 are side and front elevations and a plan view, respectively, of a single welder embodying different features of my invention, and Fig. 8 is a perspective view of the upper portion of a single welder with one work-clamp carrying table and the associated treadle-rod top or saddle removed.

Referring to Figs. 1, 2, 3 and 4 of the drawings, 1 designates the supporting frame for the working parts of a machine which is intended more particularly for double welding purposes, and for this reason is provided on its top with the relatively fixed tables 2 and 3 for carrying two sets of work-holding parts and on a forward extension of such top with a table 4, which is movable toward and away from the tables 2, 3 and carries a set of suitable work-gripping parts. Should it be desired to use this machine for single welding the table 4 may be eliminated and one of the tables 2, 3 loosed on its ways to permit it to have free movements thereon toward and away from its companion, and may be operated in any suitable manner. In this construction each table 2, 3 is shown as being provided with a jaw-carrying lever 5, which is fulcrumed to the side of a standard 6 rising from the inner end of its table and carries a work-clamping jaw 7 at its free end, which, when the lever is lowered, coöperates with a subjacent fixed jaw 8 to clamp the work A to be operated on. Each lever 5 is shown as being connected by a link 9 to the pendent short arm of an angled controlling-lever 10, which is fulcrumed to an adjustable eccentric 11 carried by the associated standard 6, and has its long arm extending rearwardly and connected with the treadle-rod 12 through the medium of a yoke or saddle-member 13, which connection forms a part of my present invention. Each eccentric 11 has its trunnion mounted for rotary adjustment between split portions of the associated standard 6, and is held in adjusted position by the action of a screw 11ᵃ on the split portions of the standard as shown in Fig. 1.

The yoke or saddle-member 13 is provided on its under side with a socketed part 14, which receives and is pivoted to the upper end of the treadle-rod, as at 15, and has stop-screws 16, 16 threaded through the opposite side walls thereof for coacting with the end of the rod 12 to limit the oscillatory movements of the yoke or saddle relative to the treadle-rod. The head of the yoke or saddle 13 is broadened and provided with a transversely-elongated opening 17 into which the rear ends of the controlling-levers 10, 10 project. In order to prevent vertical play of the lever ends in said opening and at the same time permit them to have free universal movements therein or free movements longitudinally thereof as the levers may have movements with their tables toward and away from each other, each is preferably provided at its end with a spherical-shaped anti-friction roller 18, or one having an oval tread, for working in the yoke-opening, as shown. These rollers are insulated from the yoke 13 by strips of insulation 19, as shown in Fig. 4. The treadle-rod 12 is guided for vertical reciprocatory movements by guide-members 20 secured to the frame 1, and is shown as carrying two adjusting screws 21, 21 which coact with said guide-members to limit the movements of the rod. The rod 12 is also shown as being adjustably connected to the foot-treadle 22 by a turnbuckle connection 23. It is thus apparent that while both jaw-carrying levers 5 of the tables 2, 3 are operated by a single treadle or lever they are adapted to automatically adjust themselves to clamp work of varying thickness due to the yoke or saddle 13 rocking relative to the rod 12 to permit one lever to move relatively farther than the other when the treadle is depressed to effect a clamping of the work. This is a very important feature in machines of this class, as it frequently occurs that two pieces being butt-welded are of different thicknesses, or that a single piece held by two sets of dies or jaws for the purpose of having another piece welded laterally thereto, as in double welding, is not of uniform thickness throughout its length, thus, in either case necessitating a separate adjustment of the two clamping parts and the controlling of each by an independent operating-lever. With my construction the machine can be operated much more rapidly than has heretofore been possible, due to both jaw-carrying levers being operated by a single lever and the operator being relieved of all care of adjusting the clamping parts to allow for differential movements thereof. It is also apparent that the elongated form of the yoke 13 permits an adjustment of the tables 2, 3 relative to the frame 1, or relative to and fro movements of such tables, without breaking or necessitating an adjustment of the connection between the levers 10 and the treadle-rod.

In Figs. 5, 6, 7 and 8 is shown a slightly different form of the means employed for connecting the controlling-levers with the operating means to permit relative movements of such levers, in that the yoke or saddle carried by the treadle-rod of the construction above described is made in two parts, being transversely separated in its middle, each of which parts is fixedly attached to a separate treadle-rod and forms a bearing for the outer end of one of the controlling-levers. In these figures, 24 designates the machine frame; 25 and 26 the relatively movable tables carrying the work clamping parts; 27, 27 the standards rising from the inner ends of said tables; 28, 28 the jaw-carrying levers, which are pivoted to the standards 27; 29, 29 the controlling-levers, which are fulcrumed to the standards 27, and are shown in the present instance as having a cam action on the jaw-carrying levers 28 instead of being in link connection therewith, as in the case of the construction above described; 30, 30 the anti-friction rollers which are carried by the levers 29; 31 (Fig. 8) a retracting spring for operating on each jaw-carrying lever 28 in opposition to the lever 29, said spring being secured to the under side of the lever 28 and bearing against the subjacent jaw-carrying part 32; 33, 33 two treadle-rods, which are mounted side-by-side for relative reciprocatory movements in guides 34 secured to the frame 24, each being attached at its lower end to separate treadles 35, 35, fulcrumed within the lower portion of the frame 24, and 36, 36 designate the separate saddle members which are fixed to the upper ends of the treadle-rods 33 and in which the rollers 30 at the rear ends of the levers 29 work. The saddle-members 36 are preferably of U-shape with their open ends opening horizontally and disposed toward each other, as shown, to combine to form loop means, and each has its socket of sufficient length to permit the end of the associated lever 29 to have the requisite horizontal play therein. The treadles 35, 35 have their pedal ends disposed in contiguous position, as shown in Figs. 6 and 7, to enable the operator to simultaneously depress both treadles with one foot, or to operate the treadles independently. It is thus apparent that the two treadles will be permitted to have differential movements as the varying thickness of the work being clamped may require, or in other words either treadle is adapted to be depressed to a greater extent than the other to cause its jaws to have greater relative movements than the other jaws to grip a thinned portion of the work.

In Figs. 5, 6 and 7, 37, 37 designate foot levers, one of which is pivoted to the outer side of each treadle 35 in advance of its fulcrum, as at 38, and carries a set-screw 39 intermediate its pivot and pedal end for coacting with a bracket 40, which projects from the contiguous side of the frame 24. The purpose of this is to provide foot operated means for effecting a positive raising of the treadles when depressed, as the cam form of controlling-lever 29, when depressed to effect a clamping of the work, will not move to release the jaw-carrying lever unless positively moved for such purpose. With the construction shown the free ends of the levers 37 raise when the treadles 36 are depressed, as shown in Figs. 5 and 6, and the parts then remain in such position until released by reason of the operator depressing the levers 37. When the levers 37 are depressed the set-screws 39 fulcrum on the brackets 40 and the treadles 35 raise with the pivoted ends of said levers 37.

The eccentrics 41 (see Fig. 8) on which the controlling-levers 29 are fulcrumed have their trunnions 41$^a$ mounted between split portions of the respective standards 27 and held in adjusted position by screws 41$^b$ as in the case of the form first described. A simple means for adjusting the eccentrics 41 consists in providing worm-wheels 42 on the trunnions therewith without the standards 27, which wheels are in mesh with worms 43, the shafts of which are shown in the present instance as being journaled in brackets 44 secured to the outer sides of the respective standards 27, as shown in Figs. 5, 6 and 7.

The worm shaft is provided at its upper end with a knurled head 45 to facilitate a turning of the same by hand. This is an important feature as the operator is thereby enabled to quickly and accurately adjust the fulcrum of the controlling-levers to suit the diameter of the work operated on, without the trouble and loss of time incident to the methods heretofore employed for adjusting the eccentrics.

In order to adapt the jaws 46, which are carried by the levers 28, to have movements relative to such levers to automatically adjust themselves to seat squarely on flat work irrespective of the thickness of such work to form a perfect electrical contact therebetween, I pivotally suspend such jaws from the free ends of their carrying levers whereby they are permitted to swing freely to accommodate themselves to the thickness of the work acted on. This is shown in Figs. 5, 6, 7 and 8 as being accomplished by providing a tongue on the upper portion of the jaw body which is pivoted, as at 47, within a socket in the free end of the lever 28.

The machine is shown in Figs. 1 and 2 as being equipped with the usual transformer 48, the passage of the welding current through the leads 49 of which to the sets of work-clamping jaws in the case of a double-welder being controlled by the switch-lever 50, as fully described and claimed in my former Letters Patent No. 932,441, issued August 31, 1909.

Having thus described my invention, what I claim as new and desire to secure by Letters Patent, is—

1. In a machine of the class described, the combination of a plurality of work-gripping levers, and mechanism movable to effect a positive oscillation of the levers in unison to grip the work and capable of permitting differential movements of the levers as the varying thickness of the work may require.

2. In combination in an electric-welding apparatus, a pair of levers, work-gripping jaws movable by a movement of said levers, controlling means for said levers, and means connecting said levers and controlling means for communicating movements to the former from the latter and permitting said levers to have differential movements as the thickness of the work acted on may require.

3. In a machine of the class described, the combination of a plurality of work-gripping levers, and mechanism movable to effect a positive oscillation of the levers in unison to grip the work and capable of permitting differential movements of the levers as the varying thickness of the work may require, said mechanism being also adapted to permit relative to and fro movements of the levers.

4. In a machine of the class described, the combination of a plurality of work-gripping levers, and loop means movable to effect a positive oscillation of the levers in unison to grip the work and capable of permitting relative to and fro movements of the levers.

5. In a machine of the class described, the combination of a set of relatively movable tables, a work-gripping lever carried by each table, loop means coöperating with said levers to oscillate the same and to permit relative movement thereof, and means for moving said loop means to oscillate the levers.

6. In a machine of the class described, the combination of a plurality of work-gripping levers, loop means coacting with said levers, said means being movable to effect oscillations of said levers in unison and capable of permitting relative to and fro movements of the levers while in continued contact therewith, and means for moving said loop means to effect oscillations of the levers.

7. In a machine of the class described, the combination of a lever, a work-gripping jaw movable by a movement of said lever, a controlling member for said lever, and means connecting said lever and member for communicating oscillatory movements to the former from the latter, said means being capable of permitting a lateral adjustment of the lever relative thereto, and to effect an oscillation thereof at any point in such adjustment.

8. In a machine of the class described, the combination of a lever, a work-gripping jaw movable by an oscillatory movement of said lever, a controlling-member for said lever, and a member having a horizontally elongated opening therein for receiving an end of said lever whereby to permit said lever to have horizontal play therein, and means for moving said member to effect an oscillation of the lever.

In testimony whereof, I have hereunto subscribed my name in the presence of two subscribing witnesses.

ALVIN E. BUCHENBERG.

Witnesses:
C. W. OWEN,
EUGENE SCHREIBER.